Patented Apr. 19, 1932

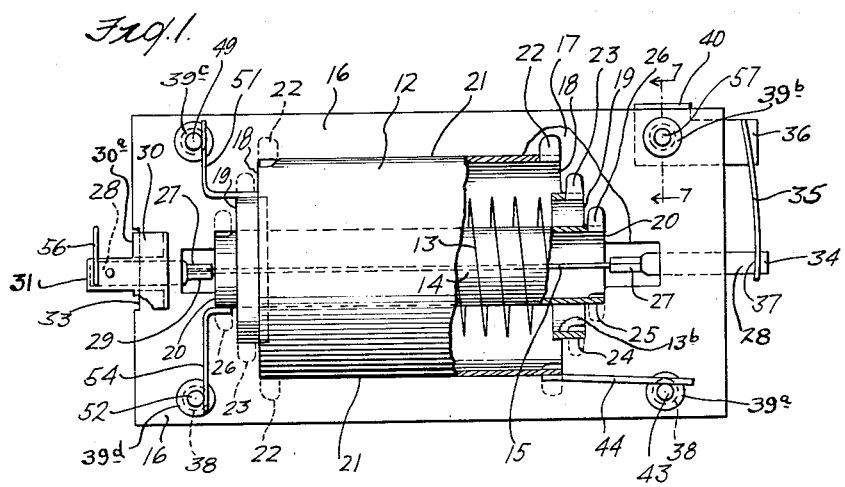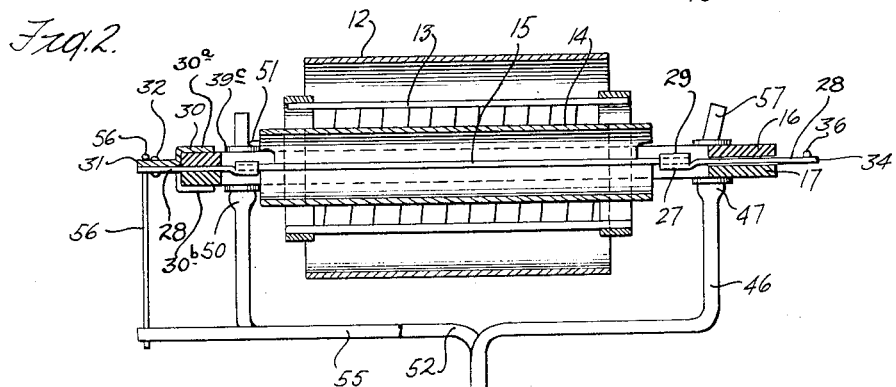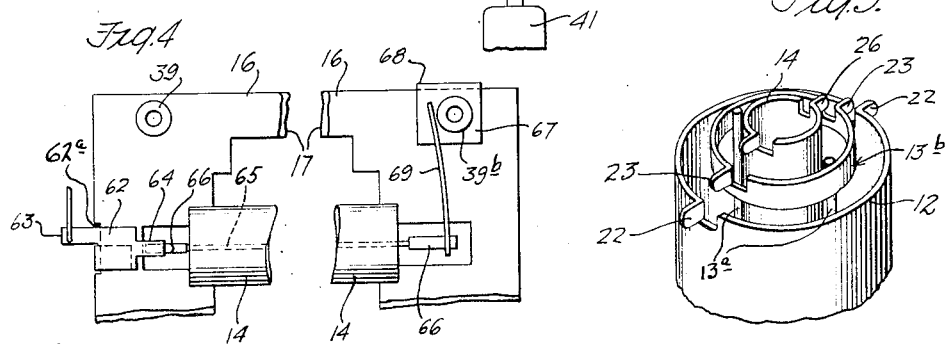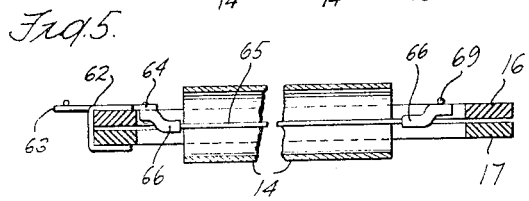

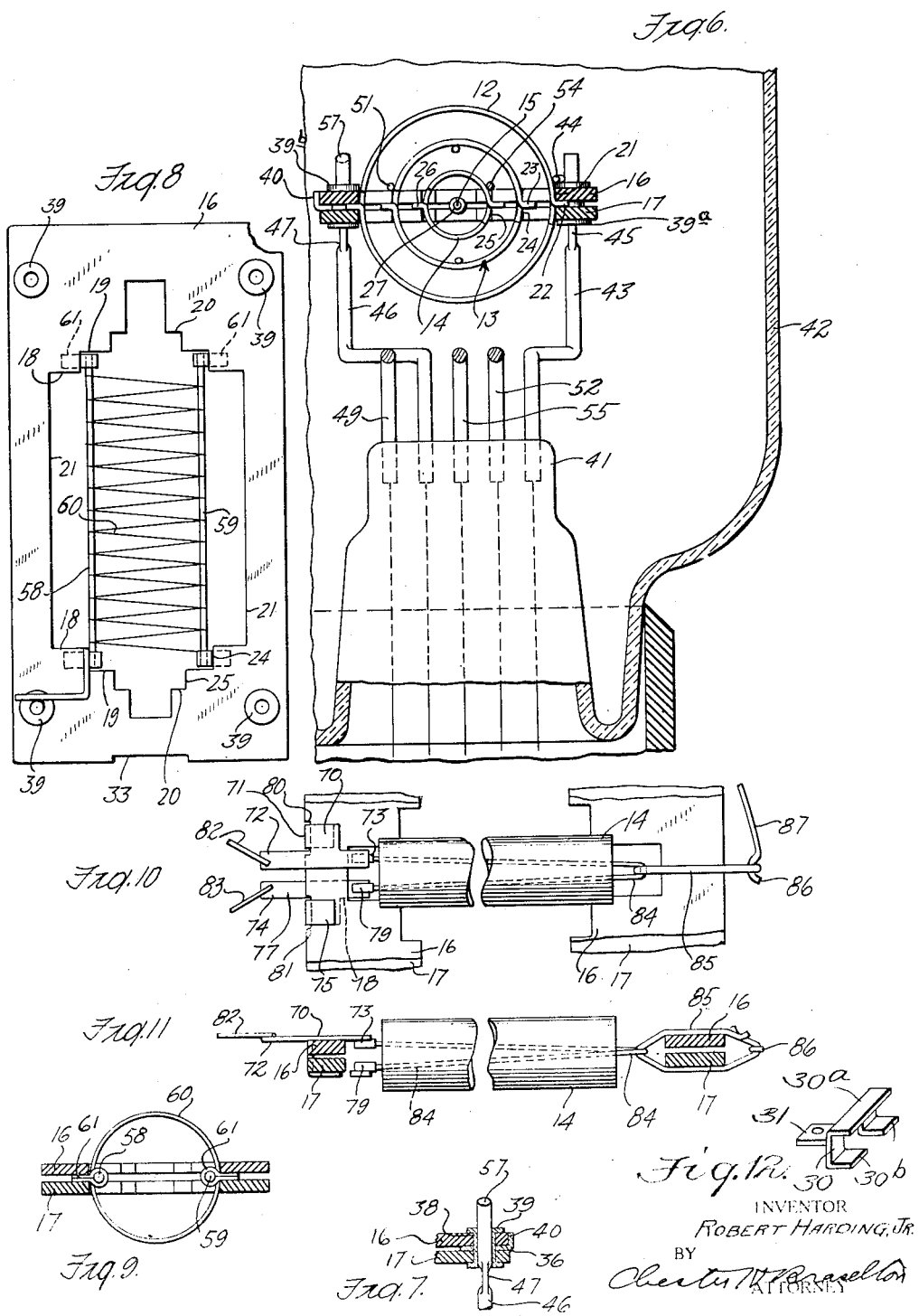

1,854,375

UNITED STATES PATENT OFFICE

ROBERT HARDING, JR., OF WHITE PLAINS, NEW YORK, ASSIGNOR TO ARCTURUS RADIO TUBE COMPANY, OF NEWARK, NEW JERSEY, A CORPORATION OF DELAWARE

UNITARY ELEMENT STRUCTURE FOR VACUUM TUBES

Application filed May 17, 1929. Serial No. 363,747.

This invention relates to vacuum tubes and particularly to a method and means for assembling the elements of a vacuum tube in spaced relation to each other and in such a manner that they form a complete unit.

In the manufacture of vacuum tubes it has been the practice heretofore to assemble all of the elements of the tube upon the glass stem which is later sealed into the envelope, the elements being usually supported on a plurality of wires which also form conductors therefor. It is essential in most vacuum tubes to space the elements a certain distance apart and maintain such spacing so that the tube will operate properly. The strength and rigidity of the support wires have been relied upon heretofore to maintain this spacing of the elements but it has been found that upon jars or vibration of the tube the weight of the elements causes the supports to bend slightly out of alignment and inasmuch as the elements are of different weights and the supports are of different lengths such movement of the elements in the tube will cause a displacement of certain elements with respect to certain other elements. In other words the spacing of the elements in a vacuum tube has heretofore been rather precarious and a great many of the tube failures have been caused by displacement of the elements due to jars, vibration, or forces arising from electrostatic or electromagnetic conditions.

It is therefore one of the objects of the present invention to provide a construction for the vacuum tube elements which will rigidly space the elements in the tube and prevent any displacement due to any cause whatsoever.

Another object of the invention is to provide a means of assembling the elements of a vacuum tube so as to provide a unitary structure which may be manufactured in large quantities and stored away for future use.

Another object of the invention is to provide a means for assembling the elements of a vacuum tube which is relatively simple and necessitates a great deal less care and expert attention than the method used heretofore.

Still another object of the invention is to provide a vacuum tube in which all of the elements are mounted on a rigid insulating base and in which the various connections to the terminals of the tube do not in any way cooperate to support the elements one from another.

Other objects of the invention and objects relating particularly to the method of supporting the individual elements and the filament will be apparent as the description of the invention proceeds.

The invention has been illustrated in the accompanying drawings in which,

Fig. 1 is a plan view of the elements of a vacuum tube and mounted in accordance with my invention;

Fig. 2 is a central sectional side elevation of the elements as shown in Fig. 1;

Fig. 3 is a perspective view of one end of certain of the elements showing the manner in which they are held by the spacing plates;

Figs. 4 and 5 are a plan and sectional side elevation of a modified manner of mounting the filament;

Fig. 6 is a sectional end view of the elements showing one method of mounting on the press of the vacuum tube;

Fig. 7 is a sectional detail view of a manner in which the elements may be supported from the press;

Fig. 8 is a plan view of a modification of the invention showing another manner of supporting the helically wound grid;

Fig. 9 is a sectional end view of the construction shown in Fig. 8;

Figs. 10 and 11 are a plan view and sectional side elevation of a means of supporting a loop filament; and Fig. 12 is a perspective view of a certain clip for holding the fixed end of the filament.

Referring now more specifically to the drawings the vacuum tube elements shown for purposes of illustration comprise a cylindrical anode 12, a helical grid 13 within the anode 12, a cylindrical cathode 14 within the grid, and a filamentary heater 15 for the cathode. In order to support these elements in spaced relation to each other I provide a pair of rectangular plates 16 and 17 which are adapted when clamped together to rigidly secure the elements in spaced relation.

The middle part of the plates is cut out to provide a large central opening at each end of which is a series of steps thereby forming a shoulder 18 at each corner forming the first step, a shoulder 19 forming the second step, and a shoulder 20 forming the third step. The side edges 21 of the central opening are spaced just far enough apart to permit the cylindrical anode 12 to pass therebetween and the opposing shoulders 18 are spaced far enough apart to just permit the anode to pass lengthwise therebetween. The anode is provided with radially bent lugs 22 which may be struck out from a portion of the anode material and which are spaced diametrically opposite each other and in the same plane so that when the anode is positioned in the opening of the mica plate 17 the plate will contact with all the lugs 22 and when the plate 16 is placed over the anode 12 and brought down against the plate 17 the lugs 22 will be between the two plates and the anode 12 will be spaced centrally of the plates as clearly indicated in Figures 1 and 2. In this position the side edges 21 of opening in the plates 16 and 17 will prevent the anode from moving from side to side in the plane of the plates, the shoulders 18 will prevent the anode from moving from end to end in the plane of the plates, and the lugs 22 will prevent the anode from moving in a plane perpendicular to the plates.

The grid 13 is made slightly longer than the anode 12 and may be formed of a helically wound wire mounted upon two support wires 13a and provided at each end with a sleeve 13b which may be welded to the wires 13a. The sleeves 13b may be also provided with lugs 23 struck out from itself in the same manner as the lugs 22 on the anode. Between the shoulders 18 and 19 on the plates 16 and 17 are edges 24 which are perpendicular to these shoulders and the distance between these edges is made corresponding to the diameter of the grid so that when the grid is placed inside of the anode with the lugs 23 between the plates similarly to the lugs 22 of the anode the edges 24 will hold the grid from any sidewise movement in the plane of the plates. The shoulders 19, opposed to each other, are placed apart just sufficiently to permit the grid to pass lengthwise therebetween and therefore hold the grid against any longitudinal movement in the plane of the plate while, of course, the lugs 23 prevent the grid from moving transversely of the plates as in the case with the anode 12.

The cathode 14 is made slightly greater in length than the grid while of course smaller in diameter and it is adapted to bear against the edges 25 which connect the shoulders 19 and 20 on the plates. The cathode is also provided with lugs 26 similar to the lugs 22 and 23 which are provided on the anode and grid respectively and these lugs 26 are adapted to fit between and be held by plates 16 and 17 in the same manner as the others. The edges 25 of the plates 16 and 17 are spaced far enough apart to permit the cathode to pass therebetween and when in place the cathode is prevented from moving sidewise in the plane of the plate by these edges while the shoulders 20 are spaced far enough apart to permit the cathode to pass lengthwise therebetween and, therefore, hold the cathode securely against lengthwise movement.

In positioning the filament 15 within the cathode 14 I find it expedient to provide each end of the filament with a tab 27 which is formed of a thin flat strip of metal 28 having one end curved into a socket 29 to receive the end of the filament. The filament may be attached to the tab 27 in any desired manner now known in the art. Where a single straight filament is used, as in the present illustration, it is necessary to rigidly secure one end thereof while providing a resilient support for the other end to compensate for variation in the length of the filament due to temperature changes and other causes. I therefore provide a clip 30 which is adapted to be bent in a U shape so as to clamp over the edge of the plates 16 and 17 as clearly indicated in Figs. 1 and 2. This clip has a central portion 31 which is bent in a plane parallel to the length of the legs of the U but in the opposite direction and is spaced slightly off the mid-point between the two legs. Actually this central portion 31 is a part of one of the legs so that the clip has one full leg 30a and two smaller legs 30b for the other side. The central portion 31 is so spaced that when the clip is put in position, as shown in Fig. 2, the lower surface of the portion 31 aligns itself with the upper surface of the flat portion 28 of the tab 27 on one end of the filament. This tab of course is inserted between the two plates 16 and 17 and may be welded to the central portion 31 of the clip 30 indicated at 32. The clip 30 fits into a notch 33 provided in the plates 16 and 17 to properly center it and maintain it in position.

It will be noticed that the lugs 22, 23, and 26 on the anode, grid, and cathode respectively are thick enough to cause a slight space between the two plates 16 and 17. The tabs 27 attached to the filament are made thin enough so that they will pass through this space without materially binding. The end of the tab 27 on the opposite end of the filament is therefore extended through the space between the plates 16 and 17 and extends a short distance on the other side as at 34 and a spring 35 welded to a clip 36 to be hereinafter described is bent under tension and welded to the end of the tab 27 as indicated at 37.

In order to secure the plates 16 and 17 together I have provided a hole 38 in each corner of each plate, the holes in the corresponding corners being adapted to align with each other. Through the hole thus formed in each corner I insert an eyelet 39 which may be pressed in a manner well known to secure the two plates together.

In Figure 7 I have shown a detail view of the eyelet showing the manner in which the clip 36 is attached to the plate. This clip is placed between the two plates and has a flange 40 which is adapted to lie along the edge of the plate 16, or 17 as the case may be, as indicated in Figs. 1 and 7 and an opening to receive the eyelet. The clip 36 is thus rigidly held in position so that the end of the filament is resiliently supported in such a manner that it cannot become displaced.

The eyelets 39 form a convenient means of attaching assembled elements to the press of the tube. In Figs. 2 and 6 a press 41 is shown which is formed integral with the walls of the envelope 42. Inasmuch as there are three elements each requiring one connection and a filament which necessitates two connections, one at each end, there are separately provided five support wires in the press 41. The wire 43 at the right hand end of the press, as shown in Figure 6, may be bent outwardly, rearwardly and upwardly passing through the eyelet 39a in that corner of the plate 16 and 17. A wire 44 may be welded to the anode 12 and brought out to the end of the plates 16 and 17 and there welded to the upper end of the wire 43. The wire 43 is provided with a flat portion at 45 which is somewhat wider than the diameter of the hole in the eyelet and prevents the eyelet from slipping down on the wire any further than is shown. The wire 44 welded on top of the wire 43 prevents the plates from being withdrawn from the wire. Another support wire 46 may be bent rearwardly and outwardly as viewed in Fig. 6 and then upwardly and through the eyelet 39b which supports the clip 36 which in turn supports the end of the filament by means of the resilient spring 35. This wire is also provided with a flattened portion 47 which prevents the eyelet from passing down any further than is shown and a wire 48 may be welded to the top of the wire 46 and to the clip 36 to make a good electrical connection therebetween and aid in holding the plates in place. A third wire 49 sealed in the press 4 may be bent forwardly toward the left as shown in Fig. 2 and upwardly through the eyelet 39c. This wire is also provided with a flat portion 50 which spaces the plates 16 and 17 thereon. A wire 51 may be welded to the top of the wire 49 and to the grid sleeve 13b to form an electrical connection therebetween and to aid in holding plates 16 and 17 in place on the wire 49. A fourth wire 52 may be bent outwardly to a point under the eyelet 39d and then upwardly passing through the eyelet. This wire may also be provided with a flat portion to space the plates 16 and 17 from the press. A wire 54 may be welded to the top of this wire 52 and to the cathode 14 to form the electrical connection between the two members. This wire also aids in maintaining the plates 16 and 17 in position. A fifth wire 55 may be provided sealed in press 41 and extending outwardly to a point beneath the end of the filament which is rigidly attached to the plates 16 and 17 by means of the clip 30. This wire indicated in Fig. 2 may end directly underneath this clip 30 and a connecting wire 56 may be welded between the clip 30 and the wire 55 to form an electrical connection thereto.

It will be seen from the above description that all of the elements of the tube are rigidly supported upon the plates 16 and 17 which are rigidly fastened together and, as a unit then mounted upon the supporting wires on the press of the tube. Thus mounted it is impossible to shake or jar any of these elements out of position with the result that the tube formed in the manner indicated will last considerably longer and be able to withstand more rough usage than tubes heretofore made.

The manner of assembling the various parts is obvious from the above description. The anode, grid, cathode, and filament are first placed together one within the other and these four elements are placed downwardly upon plate 17, the anode, grid, and cathode automatically finding their proper position next to each other due to the shoulders and edges of the plate. The plate 16 is then placed over the plate 17, first inserting the clip 36, and the eyelets are then applied and pressed into position. Then the clip 30 is pressed over the ends of both plates, as indicated, and the flat end of one of the tabs 27 is welded to the central portion 31 of the clip 30 and the other end of the filament is welded to the spring 35 which has first been welded to the clip 36. The unit is now complete and ready to be attached to the tube. The press 41 is of course provided first with the five wires bent in the desired position and then it is only necessary to slip the plates 16 and 17 over the wires as already described and weld the short connecting wires from the various elements to these supporting wires in order to complete the tube. If desired the upper ends of the two or more of the supporting wires may be sent over as indicated at 57 Fig. 2 to more securely hold the insulating plates in place. The short wires 44, 48, 51, and 54 may if desired be welded to the elements before they are inserted in the plates 16 and 17.

In the foregoing description I have described the grid as provided with sleeves at each end containing the lugs to be held by the plates. It may, however, be desirable to secure the support wires of the grid in the manner shown in Fig. 8. Support wires 58 and 59, around which a plurality of turns of the grid wire 60 may be wound, are cut to the exact length of the opening for the grid and the end of each of these wires is then provided with a metal strap 61 corresponding to the lug 23 on the grid already described. The grid of Fig. 8 will then fit into the space provided for it in the mica plates 16 and 17 in exactly the same manner as the grid shown in Figs. 1 and 2.

Thus far I have described the use of a single straight filament and illustrated one method by which it may be supported in the plates 16 and 17. However it may be desirable to use the method illustrated in Figs. 4 and 5 in which a clip 62 may be substantially U shaped with a lug 63 extending integral with one leg and beyond the bend of the U and an extension 64 in the plane of the same leg and extending somewhat beyond the end of the leg. The clip 62 may be pressed over the ends of the plates 16 and 17, a notch 62a being provided in the plates to properly position it. Each end of the filament 65 is provided with an offset tab 66 which is offset so that when one end is welded to the extension 64 of the clip 62 the central part of the filament will lie exactly in the center between the two plates 16 and 17 and centrally of the cathode 14. A clip 67 may be provided on top of the plate 16 and secured in place by means of the eyelet 39b and may be provided with a flange 68 to prevent it from rotating about the eyelet. To this clip 67 may be welded the spring 69 which will then lie along the flat upper surface of plate 16 and cross the opening provided for the filament where it may be welded to the offset tab 66 at that end of the filament. In this case therefore the spring will not extend out beyond the end of the plates 16 and 17 and will therefore be more protected.

It may be desirable to use a loop filament in place of the single straight filament explained above and the construction for such mounting is illustrated in Figs. 10 and 11. A clip 70 is provided with a U shaped portion 71 adapted to fit over the end of the plates 16 and 17 and a straight portion 72 which is outwardly extended beyond the plates and inwardly toward the cathode. This inward portion of the clip 70 provides the support for one end 73 of the filament to which it is welded. A second clip 74 is made opposite to the clip 70 with a U shaped portion 75 that is adapted to fit over the plates 16 and 17 and a flat member 76 which is adapted to lie on the opposite side of the plate 17 and has an outwardly extending end 77 and an inwardly extending portion 78 to which the other end 79 of the filament may be attached as indicated. The clips 70 and 74 are prevented from moving laterally on the plates 16 and 17 by means of the notches 80 and 81 respectively in which the U shaped members 71 and 75 fit. Wires 82 and 83 may be attached to the clips 70 and 74 for the purpose of connecting to the filament leads of the tube. The opposite or loop end 84 of the filament extends slightly beyond the end of the cathode and a loop 85 of wire is provided which passes down through the opening in the plates 16 and 17 through the loop 84 at the end of the filament and across the bottom of the plate 17 and up again where it joins its other end. This loop 85 is bent to conform to the edges of the plates and the filament loop and is adapted to engage a hook 86 which is attached to a spring 87 welded to a clip (not shown) similar to the clip 36. The spring 87 and hook 86 place a tension on the loop 84 of the filament which maintains it in its proper spaced relation with the cathode and prevents it from touching the cathode. Where such a construction is used of course the clip cannot be attached to one of the supporting wires unless it is desirable to make some connection to the loop of the filament. However a separate eyelet may be employed in the plates 16 and 17 for supporting the above clip which supports in turn the spring 87.

While I have shown the invention in connection with a heater type tube it will be evident that it is also applicable to a tube in which the cathode is also the filament and while I have shown a grid in each of the modifications it will also be evident that the grid may be dispensed with, elements for a rectifier tube being equally well supported by the construction shown. I have also shown the unit of elements supported horizontally in a tube but it may be supported vertically or in any other position equally as well. Other modifications may be made without departing from the spirit of the invention and I do not desire to limit the invention, therefore, except as defined in the appended claims.

What I desire to claim is:

1. In a vacuum tube a plurality of concentrically spaced cylindrical elements, a substantially flat plate of insulating material having an opening therein large enough to receive the largest of said elements in a lengthwise position, lugs on each of said elements adapted to engage said insulating plate, and means to secure said lugs to said plate whereby said plate is positioned diametrically of said largest element.

2. In a vacuum tube a plurality of cylindrical elements spaced concentrically of each other and increasing in length from the largest in diameter to the smallest, an insulating plate having an opening therein to receive said elements longitudinally, a lug on each of said elements adapted to engage said plate, and means to secure said lugs to said plate whereby said elements are maintained in spaced relation to each other.

3. In a vacuum tube a plurality of concentrically spaced cylindrical elements, an insulating plate having an opening therein large enough to receive said elements longitudinally thereof, lugs on said elements adapted to engage said plate whereby said plate lies diametrically of said elements, and a second insulating plate having an opening therein adapted to receive said elements and adapted to hold the lugs when said second plate is placed over the first plate, and means to hold said plates together.

4. In a vacuum tube a cylindrical anode, a cylindrical grid within said anode and slightly longer than said anode, a cylindrical cathode within said grid and slightly longer than said grid, lugs extending outwardly from each of said elements and adapted to lie in the same plane, an insulating plate having an opening therein large enough and so formed as to receive all of said elements so that said plate lies diametrically thereof and said lugs contact with said plate, a second plate cut out to receive said elements and adapted to engage the other sides of said lugs and means to hold said plates together.

5. In a vacuum tube a plurality of concentrically spaced cylindrical elements, lugs extending outwardly from said elements and lying substantially in the same plane, an insulating plate having an opening therein adapted to receive said elements longitudinally thereof and adapted to contact with said lugs, and means to secure said lugs against said plate, a filament extending longitudinally of said smallest element, means to rigidly secure said filament at one end of said plate, and means to resiliently support the other end of said filament from the other end of said plate.

6. In a vacuum tube a plurality of cylindrical elements concentrically spaced, the inner element being the longest and the other elements being successively shorter, a flat plate of insulating material having an opening therein large enough to accommodate longitudinally said elements and so shaped as to fit the ends thereof, each of said elements having lugs extending outwardly therefrom and adapted to lie in the same plane, whereby when said elements are positioned in the opening in said plate said lugs will contact with said plate, a second plate having a similar opening and adapted to fit upon said first plate whereby said lugs are rigidly held between said plates, means to secure said plates together, a filament longitudinally disposed within said smallest element, means to rigidly secure said filament to one end of said plates, and means to resiliently mount said filament on the other end of said plates.

7. In a vacuum tube a plurality of elements, projections on each of said elements, a non-conductive member, said elements being positioned in such a manner that the projections thereof contact with said non-conductive member, a second non-conductive member, adapted to contact with the other side of said projection, means to hold said members together whereby said projections are rigidly secured therebetween and said elements held in spaced relation, means to support said members in a vacuum tube, and means to electrically connect said elements with the terminals of said tube.

8. In a vacuum tube an envelope, a press, a plurality of supporting conducting wires sealed in said press, a plurality of elements, each of said elements having a projection adapted to lie in the same plane, an insulating member, said elements being so spaced that the projections thereof will contact with said insulating member, means to secure said projections to said insulating member whereby said elements are held in spaced relation to each other, and means to mount said insulating member upon said support wires.

9. In a vacuum tube a cylindrical anode, a cylindrical grid within said anode and extending beyond the end thereof, a cylindrical cathode within said grid and extending beyond the end of said grid, lugs extending from said anode, grid, and cathode adapted to lie in the same plane when said elements are properly positioned, a plate of insulating material having an opening therein adapted to longitudinally receive said anode, the end of said opening having a recess to receive the end of said grid, and a smaller recess to receive the end of said cathode, a second plate of insulating material cut similarly to said first plate and adapted to be placed upon said first plate with said lugs between said plates, eyelets in the corners of said plates adapted to hold said plates together, a press, a plurality of support wires in said press, said support wires passing through said eyelets whereby said plates are rigidly supported upon said support wires, and means to electrically connect said elements to said support wires.

10. In a vacuum tube a plate of insulating material, a plurality of elements, said plate having an opening therein large enough to receive said elements, means to support said elements upon said plate, a filament positioned adjacent said elements and lying in the plane of said plate, a clip bent around the end of said plate and welded to one end of said filament whereby said filament is rigidly supported at that end of said plate, a second clip rigidly secured to said plate, and a spring welded to said clip and welded to the other end of said filament whereby said filament is maintained under tension.

11. In a vacuum tube a cylindrical anode, a cylindrical cathode within said anode extending beyond the end thereof, a flat plate of insulating material having its central portion cut out to conform to the longitudinal dimensions of said anode and having recesses in each end of the opening so formed to receive said cathode and additional recesses to receive the ends of said filament, lugs on said anode and cathode extending outwardly and adapted to lie in the same plane whereby when said cathode and anode are inserted in the opening in said plate said lugs will rest upon the surface of said plate, a second plate cut similarly to said first plate adapted to be placed upon said first plate whereby said lugs are rigidly held between said plates and said elements are spaced from each other, an eyelet at each corner of said plates to hold said plates together, a clip in one corner secured by the eyelet at that corner, a spring welded to said clip extending in the plane of said plates and welded to one end of said filament whereby said filament is maintained under tension, and a second clip attached to the opposite end of said plates and welded to the opposite end of said filament to rigidly secure that end of said filament to said plate.

12. In a vacuum tube a cylindrical anode, a cylindrical grid within said anode and extending beyond the end thereof, a cylindrical cathode within said grid and extending beyond the end of said grid, a filament within said cathode and extending beyond the end thereof, an insulating plate having an opening cut out of the central portion thereof wide enough and long enough to receive longitudinally said anode, said opening having a recess at each opening thereof wide enough and deep enough to receive the end of said grid, and another recess at each end wide enough and deep enough to receive said cathode, and still another recess in each end wide enough and deep enough to receive the end of said filament, a plurality of lugs extending radially and diametrically outwardly from said anode, a plurality of lugs extending radially outwardly and diametrically from said grid, a plurality of lugs extending radially outwardly and diametrically from said cathode, whereby when said anode, grid, and cathode are inserted in said plate, said plate will contact with said lugs and take a position diametrically of said anode, grid, and cathode, a second plate cut similarly to said first plate and adapted to be placed upon it whereby said lugs are secured between said plates, an eyelet in each corner of said plates adapted to hold said plates together, means to rigidly secure one end of said filament to one end of said plates, means to resiliently secure the other end of said filament to the other end of said plates, a press, a plurality of support wires in said press, the ends of said support wires being maintained in spaced relation and adapted to be inserted in said eyelets, means on said support wires to maintain said eyelets spaced upon said wires, and means to electrically connect said anode, grid, cathode, and filament to said support wires.

13. In a vacuum tube a cylindrical anode, a cylindrical grid within said anode and extending beyond the end thereof, a cylindrical cathode within said grid and extending beyond the end thereof, a heating filament longitudinally disposed within said cathode and extending beyond the end thereof, an insulating plate having an opening therein cut to conform to the longitudinal dimensions of said anode, a recess in each end of said opening adapted to conform to the ends of said grid, another recess in each end of said opening adapted to conform to said cathode, and another recess in each end of said opening adapted to receive the end of said filament, lugs on said anode extending radially outwardly adapted to lie in the same plane, lugs on said grid extending radially outwardly and adapted to lie in the same plane, lugs on said cathode extending radially outwardly and adapted to lie in the same plane, a second plate of insulating material cut to conform to the first plate and adapted to be placed upon the first plate whereby the lugs on said anode, grid, and cathode are held between said plates, means to hold said plates together, a clip on one end of said plates adjacent the recess for the filament and welded to said filament, a flat strip attached to the other end of said filament extending between said two plates but thinner than the space between said plates so that the strip will not be held by said plates, a second clip rigidly secured to the other end of said plate and a spring welded to said clip and welded under tension to said flat strip whereby said filament is maintained under tension.

14. In a vacuum tube a cylindrical anode, a cylindrical grid within said anode and extending beyond the end thereof, a cylindrical cathode within said grid and extending beyond the end thereof, a filament longitudinally disposed within said cathode, an insulating plate having an opening corresponding to the longitudinal dimensions of said anode and having a recess at each end thereof to conform to the end of said grid and having a recess to conform to the end of said cathode, and also a recess at each end to receive the end of said filament, a second insulating plate cut to conform to said first insulating plate and adapted to be placed upon said first plate whereby said lugs are held between said plates and said anode, grid, and cathode are maintained in spaced relation to each other, means to hold said plates together, a clip secured to one end of said plates adjacent said filament recess and having a portion extending over said recess, an offset tab secured to the end of said filament and welded to said portion whereby said filament is spaced in the center of said cathode, a second clip secured to the opposite end of said plates adjacent one side thereof, an offset member secured to the opposite end of said filament, and a spring welded to said second clip and extending across the base of said plate and welded to said offset member whereby said filament is maintained under tension in the axis of said cathode.

15. In a vacuum tube a plurality of cylindrical elements, lugs on said elements and adapted to lie in a single plane, an insulating member adapted to contact with said lugs, a second insulating member adapted to contact with the other sides of said lugs, means to hold said insulating members together whereby said lugs are securely held therebetween and said elements are maintained in spaced relation, and a loop heater for one of said elements, means to secure the ends of said loop to one end of said insulating member, and means to resiliently support the loop end of said heater at the other end of the insulating members.

16. In a vacuum tube a cylindrical anode, a cylindrical grid within said anode and extending beyond the ends thereof, a cylindrical cathode within said grid and extending beyond the ends thereof, a filament within said cathode and adapted to heat said cathode, an insulating plate cut out at its central portion to form the longitudinal cross-section of said anode and having recesses in each end thereof to conform to the ends of said grid, said cathode, and said heater, a pair of clips spaced apart but adjacent the filament recess at one end of said plate and rigidly secured to said plate, one end of said hairpin heater being attached to one clip and the other end to the other clip, a continuous loop of wire at the other end of said plate and passing through the loop of said hairpin filament and around the end of said insulating plate, a clip rigidly attached to this end of said plate adjacent one side thereof and a spring welded to said clip and adapted to engage said loop of wire whereby said hairpin filament is maintained under tension.

17. In combination with a plurality of elements of a vacuum tube, said elements being arranged one within another and with the ends of the inner elements projecting from outer elements, a substantially flat insulatory member exterior to all of said elements in edgewise engagement with and supporting all of the inner elements at the projecting ends thereof.

18. In combination with a plurality of elements of a vacuum tube, said elements being arranged one within another and with the ends of the inner elements projecting from outer elements, lugs on the projecting ends of said elements, a substantially flat insulatory member exterior to all of said elements in edgewise engagement therewith adjacent said lugs for rigidly supporting all of the inner elements at the projecting ends thereof by said lugs.

In testimony whereof, I affix my signature.
ROBERT HARDING, JR.